United States Patent [19]
Lauer

[11] Patent Number: 5,690,829
[45] Date of Patent: Nov. 25, 1997

[54] CONDITIONING PROCESS AND DEVICE FOR PRODUCING PURE WATER

[76] Inventor: Günter Lauer, Hartmattenstrasse 19, Lörrach D-79539, Germany

[21] Appl. No.: 347,406

[22] PCT Filed: May 28, 1993

[86] PCT No.: PCT/EP93/01348

§ 371 Date: Mar. 21, 1995

§ 102(e) Date: Mar. 21, 1995

[87] PCT Pub. No.: WO93/24212

PCT Pub. Date: Dec. 9, 1993

[30] Foreign Application Priority Data

Jun. 2, 1992 [DE] Germany ............... 42 18 115.1

[51] Int. Cl.$^6$ .................................................. B01D 61/00
[52] U.S. Cl. .................... 210/636; 210/650; 210/85; 210/89; 210/134; 210/138; 210/321.69; 210/652
[58] Field of Search ...................... 210/650, 652, 210/646, 195.1, 89, 85, 134, 138, 636, 136, 321.69

[56] References Cited

U.S. PATENT DOCUMENTS

| | | |
|---|---|---|
| 3,502,211 | 3/1970 | Poelnitz et al. |
| 3,505,215 | 4/1970 | Bray ............................ 210/636 |
| 4,629,548 | 12/1986 | Ellis, III ....................... 210/636 |
| 4,936,997 | 6/1990 | Taniguchi et al. ............ 210/637 |
| 5,047,154 | 9/1991 | Costock et al. .............. 210/636 |
| 5,147,552 | 9/1992 | Hlavacek et al. ............ 210/636 |
| 5,364,534 | 11/1994 | Anselme et al. ............. 210/257.2 |

FOREIGN PATENT DOCUMENTS

| | | |
|---|---|---|
| 126714 | 11/1984 | European Pat. Off. ....... 210/636 |
| 0355632 | 2/1990 | European Pat. Off. |
| 0470015 | 2/1992 | European Pat. Off. |
| 2586202 | 2/1987 | France. |
| 3411471 | 10/1985 | Germany. |
| 3927291 | 3/1990 | Germany. |
| 4021123 | 4/1991 | Germany. |
| 1028563 | 8/1974 | Japan ............................ 210/636 |
| 1381410 | 6/1975 | United Kingdom .......... 210/636 |

*Primary Examiner*—Ana Fortuna
*Attorney, Agent, or Firm*—Panitch Schwarze Jacobs & Nadel, P.C.

[57] ABSTRACT

The invention pertains to a process for the production of pure water, in which raw water, or feed water similarly, is fed to a treatment apparatus (1) that has at least one semi-permeable membrane (4), in conjunction with which a partial quantity of the raw water passes through the membrane (4) as pure water under the driving force of a pressure differential, and the remaining quantity of raw water that flows past the membrane leaves the treatment apparatus (1) as concentrate. In order to counteract any excessive soiling of the membrane (4), and to attain the longest possible operational and membrane service lifetimes, it is provided that the direction of flow of the raw water past the membrane (4) is reversed at intervals of time. The invention also pertains to a treatment apparatus (1) for the production of pure water, with at least one semi-permeable membrane (4). The treatment apparatus (1) has at least two apparatus openings (10, 11) that feed into its raw water, or feed water, area (5), one of which is used as a water inlet for feeding the raw, or feed water to the membrane (4), and the other is provided as a water outlet for the concentrate, and at least one pure water outlet in its pure water area (6), the treatment apparatus openings (10, 11) that lead to the raw water, or feed water area (5) are provided with a flow reversing device to at intervals of time alternately be used as a water inlet or as a water outlet.

12 Claims, 3 Drawing Sheets

CONDITIONING PROCESS AND DEVICE FOR PRODUCING PURE WATER

FIELD OF THE INVENTION

The invention pertains to a process for the production of pure water, in which raw water, or feed water similarly, is fed to a treatment apparatus that has at least one semi-permeable membrane, in conjunction with which a partial quantity of the raw water passes through the membrane as pure water under the driving force of a pressure differential, and the remaining quantity of raw water that flows past the membrane leaves the treatment apparatus as concentrate.

The invention is also concerned with a treatment apparatus for the production of pure water, with at least one semi-permeable membrane which separates a raw water, or feed water, area from a pure water area in such a way that a partial quantity of the raw, or feed water that flows past the membrane passes through the membrane as pure water under the driving force of a pressure differential, in conjunction with which the treatment apparatus has at least two openings that feed into its raw water, or feed water, area, one apparatus opening of which is used as a water inlet for feeding the raw, or feed water to the membrane, and the other apparatus opening of which is provided as a water outlet for the concentrate, and in conjunction with which the treatment apparatus exhibits at least one pure water outlet in its pure water area.

BACKGROUND OF THE INVENTION

With ultrafiltration, microfiltration, and, in particular, the reverse osmosis technique, various procedures are already known for the production of pure water, in which from raw water that is charged with a mixture of substances, pure water that is less charged than the raw water is produced by means of a semi-permeable membrane.

Thus, a treatment apparatus that exhibits a so-called winding module within an apparatus housing is already known. This winding module is comprised of several double-walled flat membranes that are wound in spiral fashion around a filtrate collector pipe. While the filtrate collector pipe and the interior membrane areas, enclosed by the two walls of each membrane, are a part of the pure water area of the previously known treatment apparatus, the outer walls of the flat membranes, which overlap and are held at a slight distance, limit its raw water area. The raw water flows into the raw water area of the winding module at the one end, to leave this raw water area at the other, opposite end of the module as concentrate. As this is taking place, only a partial quantity of the raw water that flows past the flat membranes passes through them as pure water under the driving force of a pressure differential.

Since the raw water flows only in one direction through the winding module of the previously known treatment apparatus, the winding module exhibits a ring seal only at the end that is facing the direction of flow—a ring seal whose sealing lips point against the direction of flow and towards the inner wall of the adjacent apparatus housing and seal off the annular gap between the inner wall of the apparatus housing and the outer side of the tubularly wound winding module.

As is the case with other membrane modules, a winding module of such a type is also susceptible to impurities and breakdowns. For that reason, there is routinely placed ahead of such modules, in the direction of flow, a sieve-like pre-filter, which is supposed to counteract any dirtying of the membranes by large particles and which has to be changed frequently if the raw water is heavily contaminated. In spite of that, the membranes still get dirtied during periods of operation, particularly in the winding module end area that is facing the direction of flow of the raw water.

SUMMARY OF THE INVENTION

Therefore, the task exists particularly of creating a process for the production of pure water that allows longer periods of operation and greater service intervals for the semi-permeable membranes that are used with it. At the same time, the task exists of creating a treatment apparatus specifically for carrying out this process.

In the case of the process of the type described at the beginning, the solution in accordance with the invention consists of the fact that the direction of flow of the raw water past the membrane is reversed or changed at intervals of time.

Through a reversal in the direction of flow of the water past the membrane or membranes, both end areas of the module being used are utilized. When this is done, the particles of dirt that had come to rest, particularly in the area that was facing the direction of flow before the reversal of the flow direction, are rinsed out, while the opposite end area of the module, which until then had been less heavily loaded with particles of dirt, forms the front-most area in the direction of flow until the next reversal in the direction of flow. By means of this front-and-back utilization of the module, its operational and membrane service lifetimes can be substantially increased and the necessary maintenance intervals lengthened. Since with each reversal in the direction of flow, the area of the module that had been more severely dirtied until then temporarily forms the area that is rear-most in the direction of flow and that is rinsed by raw water, the otherwise usual pre-filters that are placed ahead of the module can be dispensed with as such, which makes for a not-insignificant savings in space and expenses.

In accordance with a further developmental suggestion that is important enough to be deserving of protection in its own right, it is provided that by means of a time-related reduction or interruption of the discharge of pure water at the membrane, an increase of the static water pressure on the pure water side of the membrane is brought about, and that following a static increase in the pressure on the pure water side, and particularly, following a balance of the static water pressure on both sides of the membrane, the static water pressure that exists on the raw water side of the treatment apparatus is lowered, at intervals of time, briefly and preferably abruptly, relative to the static water pressure that exists on the pure water side. Particularly by means of such an abrupt or pulse-like reduction of the static water pressure that exists on the raw water side of the treatment apparatus relative to the static water pressure that exists on the pure water side, the production of pure water is indeed interrupted. However, this transient change in pressure leads to a surge-like reverse flow of the pure water from the pure water area, which is briefly exhibiting the higher static pressure, to the raw water area. This reverse flow brings about a thorough rinsing of the membrane walls as well as a cleaning of the module at appropriate intervals of time, so that longer membrane service periods are encouraged. In conjunction with this, by way of example the flow speed, and with it the dynamic water pressure of the raw water that is flowing past the membrane, can be increased in order to lower the static water pressure that exists on the raw water side.

A preferable process sequence provides that the discharge of the raw water and the discharge of the pure water at the membrane are briefly reduced or interrupted at intervals of time, and that before any opening or increase of the pure water discharge, an opening or increase of the raw water discharge takes place at the membrane, preferably in a flow direction that is reversed relative to the direction of flow of the raw water past the membrane before the reduction or interruption. If, for example, the raw water discharge and the pure water discharge at the membrane are stopped briefly at intervals of time, at first, the same static pressure is built up on both sides of the membrane. If the raw water discharge is now opened first, then, in accordance with Bernoulli's equation, the static pressure on the pure water side of the membrane is facing a static water pressure on the raw water side of the membrane that is less (through an increase in the dynamic water pressure). This transient static pressure differential, which, in comparison with the pressure differential during the pure water production phase, creates opposing static pressure relationships, brings about a surge-like reverse flow of the pure water through the membrane towards the raw water side, which rinses out the particles of dirt that have become lodged on the raw water side. With the subsequent opening of the pure water discharge as well, these pressure relationships are again removed, and a higher relative pressure is achieved on the raw water side, which is necessary for the production of pure water using, for example, reverse osmosis. By means of this reversal of the direction of flow, the rear-most end area before the reversal of the direction of flow now forms the front-most end membrane area, in which the particles of dirt lodge more severely. By means of a constant change in the pressure relationships on both sides of the membrane, as well as in the flow direction of the raw water, the treatment apparatus is continuously cleansed of dirt particles, which encourages long operational and membrane lifetimes.

It is beneficial if the intervals of time that are provided for a reversal of the direction of flow and/or for a change in the water pressure at the membrane, and/or the extent of the water pressure change at the membrane are chosen depending on the degree of contamination of the raw water or feed water. By means of a change with respect to the duration and frequency of the time intervals provided for a reversal of the direction of flow and for a change in the water pressure in the pure water area and/or the raw water area, the process for the production of pure water, in accordance with the invention, can be adapted to the degree of contamination of the raw water that is being used. However, in addition to, or instead of this, such an adaptation can also be brought about by means of an increase or a decrease of the relative static pressure that is prevailing on the pure water side in comparison to the raw water side, if during the rinsing or cleaning phase of the treatment apparatus, a comparatively lower relative static pressure exists on this raw water side, and the pure water transfers through the membrane from the pure water side to the raw water side.

It is also possible, after every reversal of flow direction, to supply raw water, or feed water from the same raw water source, to the treatment apparatus. What is meant by feed water is any water that is fed into the treatment apparatus for the production of pure water. If, however, because of an increased concentration of the raw water or because of its high salt content, it is feared that there may be an unwanted higher osmotic counter-pressure of such a type that would make a buildup of pressure in the pure water area difficult or impossible, then it may be beneficial if pure water, or water with a lower salt content to be used as feed water, is temporarily fed to the treatment apparatus for intermittent flow-through in a reverse flow direction, especially during the rinsing phase of the treatment apparatus, which is a brief reduction of the static water pressure on the raw water side in comparison with the water pressure existing on the pure water side of the treatment apparatus.

As a result, for a time only pure water, or water with a low salt content, flows past the membrane on the raw water side during one of the two directions of flow. Thus, fed to the membrane in the one direction of flow, and particularly during the pure water production phase, is the raw water from the feed water source in question, in conjunction with this, and following a reversal in the direction of flow (that is, during the rinsing phase, in which the static water pressure existing on the raw water side is briefly lowered in comparison with the static water pressure existing on the pure water side) to send past the membrane in the other, opposite direction of flow, a portion of the pure water that was produced up to that point in time or water with a lower salt content.

Particularly if sieve-like pre-filters placed ahead of the treatment apparatus in the direction of flow have been dispensed with, it can be advantageous if chemical deposit aids, adsorption agents, and/or absorption agents (for example, activated charcoal powder) are fed into the raw water, or feed water, ahead of the membrane in the direction of flow.

The solution in accordance with the invention, in the case of the treatment apparatus of the type mentioned at the beginning, consists particularly of the fact that the apparatus openings that lead to the raw water, or feed water, area of the treatment apparatus are provided at intervals of time alternately as a water inlet or a water outlet. A further development in accordance with the invention provides, in addition, that the flow direction of the water past the membrane on the raw water, or feed water, side can be reversed by means of a flow-reversing device, whereas this flow-reversing device can be made up of multiple-way valves.

In order to be able to bring the water pressure in the raw water area and in the pure water area to the same static water pressure, for example, and, in conjunction with this, to be able to briefly lower the static water pressure in the raw water area for the surge rinsing of the membrane, it is beneficial if, for the alternating pressure matching and pressure changing of the water pressure existing in the raw water area and in the pure water area of the treatment apparatus, the pure water outlet and the apparatus openings that lead to the raw water area can each be regulated by means of a stop valve or a similar kind of shut-off device or regulating device. In conjunction with that, a surge-like thorough rinsing of the membrane by the water that is temporarily transferred from the pure water area into the raw water area is encouraged if the stop valves are configured as ball valves or a similar kind of quick-acting fitting.

In order to be able to thoroughly rinse the membrane over a specific period of time during the rinse phase of the treatment apparatus, one form of implementation in accordance with the invention provides that, between the pure water area of the membrane and the stop valve of the pure water outlet, there is provided an intermediate reservoir that is connected, preferably without a check valve, with the pure water area of the treatment apparatus so that a larger quantity of the pure water can transfer through the membrane into the raw water area of the treatment apparatus when the pressure relationships are suitable.

The treatment apparatus can be operated with the most varied membrane modules when using the process in accordance with the invention. In accordance with one suggestion that is especially easy to produce, in accordance with the invention, it is, however, provided that the treatment apparatus exhibits at least one winding module as a semi-permeable membrane and that at least one face of the winding module serves preferably as a deposit filter and/or a pre-filter.

In conjunction with that, it can be advantageous if the treatment apparatus has an apparatus housing for holding a winding module, the housing interior of which is connected with the feed-side and outlet-side raw water line, or feed water line, and if the annular gap formed between the winding module and the apparatus housing is provided with a ring seal which is preferably placed at one end region of the winding module and which seals the annular gap in only one direction of flow, and which is permeable in the opposite direction of flow. Since in the case of a form of implementation such as this, the annular gap, formed between the outer housing and the winding module, is also rinsed through, at least in one flow direction, against the blocking direction of the ring seal for the raw water, by this raw water, an unwanted buildup of dirt is also counteracted in this area of the treatment apparatus.

Additional features of the invention can be found in the following description of an implementation example in accordance with the invention, in conjunction with claims and the drawing. The individual features can be realized either each by itself, or in multiples, within one form of implementation of the invention.

BRIEF DESCRIPTION OF THE DRAWINGS

Shown in the representation, which is heavily schematicized in parts, are the following.

DETAILED DESCRIPTION OF PREFERRED EMBODIMENT

Figure 1:
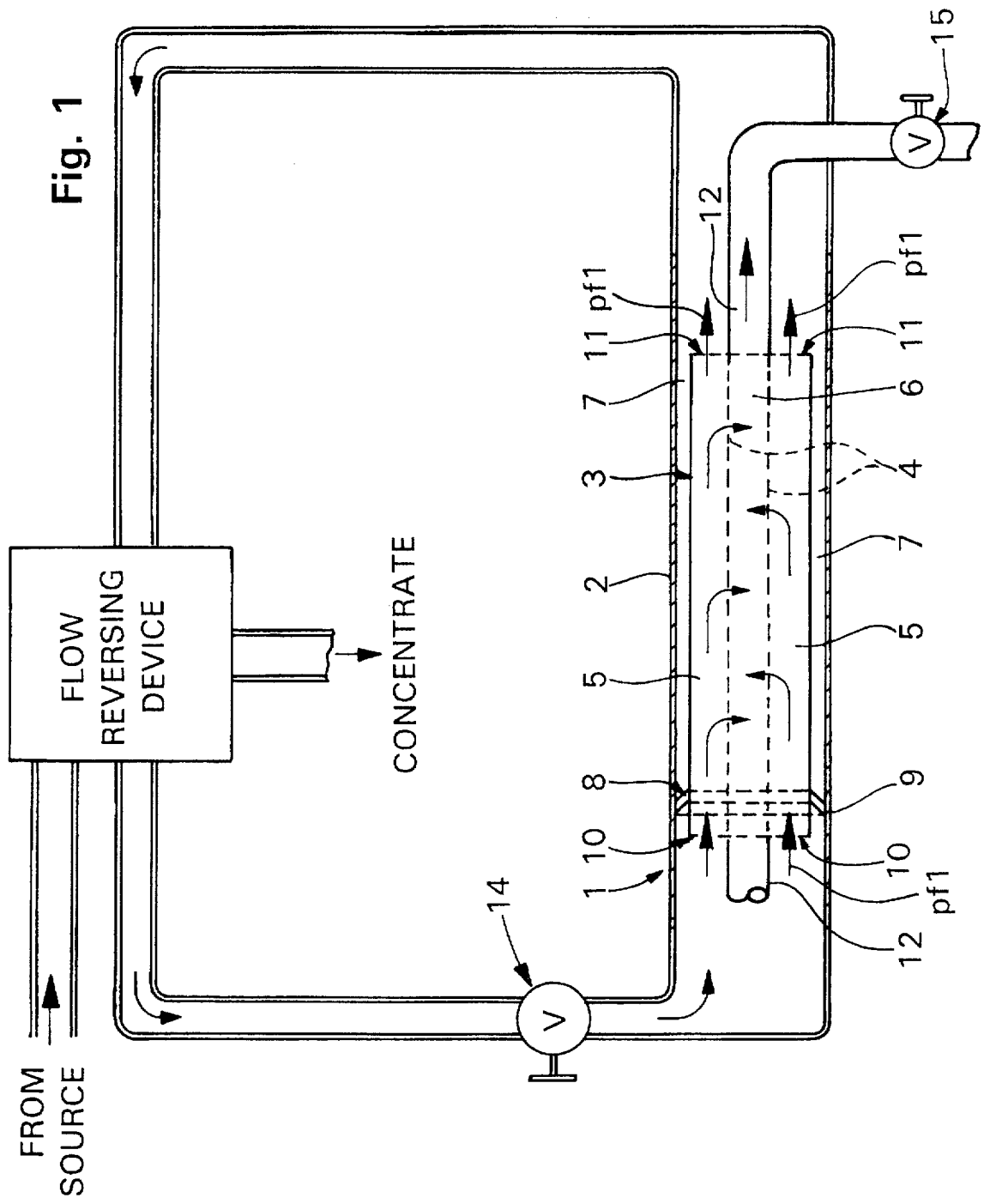
FIG. 1 A treatment apparatus for the production of pure water, which exhibits, in a pipeline or a similar apparatus housing, a winding module through which raw water flows, FIG. 2 An additional, simplified representation of the treatment apparatus in FIG. 1, whereby the raw water flows through the treatment apparatus in a direction that is reversed with respect to that of FIG. 1, FIG. 3 The treatment apparatus from FIGS. 1 and 2, whereby the raw water discharge and the pure water discharge are each shut off by means of a stop valve.

FIG. 1 shows a treatment apparatus 1 for the production of pure water, which contains a winding module 3 inside a tubular apparatus housing 2. The winding module 3 has at least one semi-permeable membrane 4, which is shown here in a tubular shape and indicated by means of dashed lines. The semi-permeable membrane separates a raw water area 5 from a pure water area 6 of the treatment apparatus 1.

The annular gap 7 that is formed between the outside of the winding module 3 and the inside of the apparatus housing 2 is sealed by means of a ring seal 8 of the winding module 3, the outer sealing lip 9, or similar external free end, of which points in the direction towards the adjacent front end of the winding module 3. As a result of this configuration of the ring seal 8, it seals the annular gap 7 only in the direction of flow of the raw water that is shown in FIG. 1, while it is at least partially permeable in the opposite direction of flow of the raw water.

At each of the two ends of the winding module 3 there is provided at least one apparatus opening 10 and 11, here ring-shaped, of which the one apparatus opening 10 in FIG. 1 is used as a water inlet for supplying the raw water, or feed water, and the other apparatus opening 11 is provided as the water outlet for the concentrate that is flowing past the membrane 4. The pure water area 6 of the treatment apparatus 1 makes a transition into the filtrate collector pipe 12, which on both sides of the winding module 3 protrudes beyond the module and forms the pure water outlet 13 (cf. FIGS. 3 through 5).

As with the usual winding modules, in the pure water production phase shown in FIG. 1, the raw water that is supplied to the treatment apparatus 1 flows through the apparatus opening 10 in the arrow direction Pf1 and into the raw water area 5. Since during the pure water production phase a water pressure that is higher than that of the pure water area 6 prevails in this raw water area 5, a partial quantity of the raw, or feed water that is flowing past the membrane 4 passes through the membrane 4, under the driving force of a pressure differential, as pure water which can be drawn from the treatment apparatus 1 at the left and/or right ends, as shown in FIG. 1, of the filtrate collector pipe 12.

In the phase of pure water production that is represented in FIG. 1, the contaminants that are contained in the raw water are collected primarily in the front-end area, relative to the direction of flow, of the winding module 3, while the rear-end area, relative to the direction of flow, is less loaded with dirt particles. In order to also make use of the end area of the winding module 3 that is presently less loaded with dirt particles and in order to attain longer membrane service periods, the flow direction of the raw water past the membrane, in the treatment apparatus 1, in accordance with the invention, is changed at intervals of time.

Figure 2:
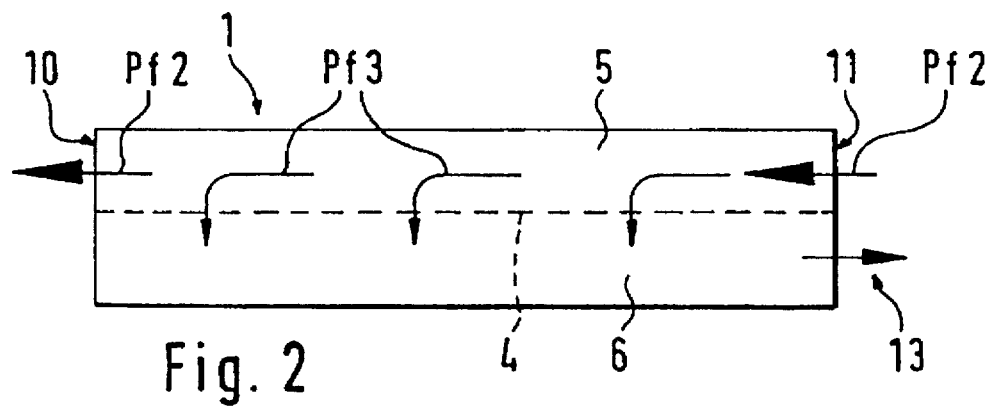

FIG. 2 shows the treatment apparatus 1 following one such reversal of the flow direction in an additional simplified representation. It can be seen clearly in FIG. 2 that the flow direction of the raw water past the membrane 4 is reversed, or changed, at intervals of time. The apparatus opening 10 that is being used as a water inlet in FIG. 1 forms the water outlet in FIG. 2, while the apparatus opening 11 that was provided as the water outlet, before the reversal of the flow direction, is provided as the water inlet in FIG. 2, which, since it is now the front end area of the winding module 3 in the direction of flow Pf2, is more strongly subject to soiling.

Figure 3:
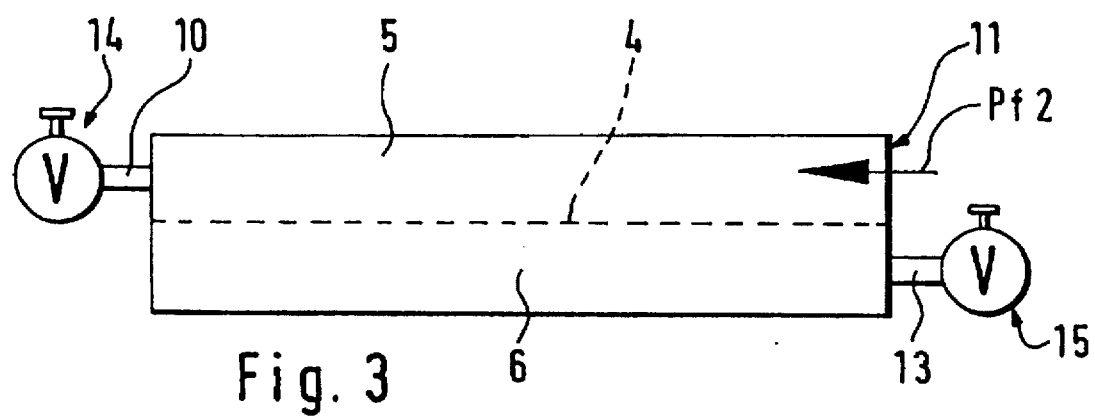
Figure 4:
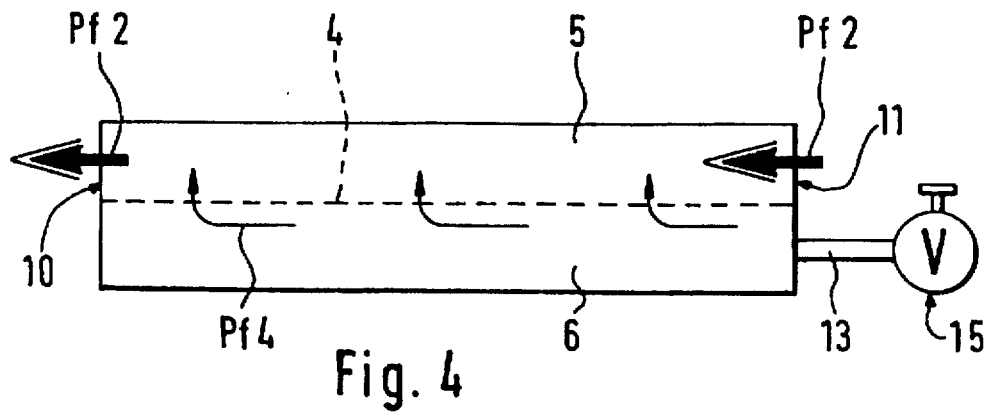
FIG. 4 The treatment apparatus from FIGS. 1 through 3 in a so-called rinsing phase, in which only the pure water discharge is shut off and the static water pressure that exists on the pure water side is facing a static water pressure that is lower on the raw water side, which leads to a transfer of pure water through the membrane to the raw water side of the treatment apparatus, and FIG. 5 A treatment apparatus that is likewise shown in its rinse phase and that is similar to the one in FIGS. 1 through 4.

It can be seen in FIG. 3 that the pure water outlet and the apparatus openings 10 and 11 that lead to the raw water area 5 can each be regulated by means of a stop valve 14 and 15. Of the stop valves that are assigned to the apparatus openings 10 and 11, only the stop valve 14 of the apparatus opening 10 is shown. By means of the closing of the stop valves 14 and 15 and the interruption of the raw water and pure water discharge at the membrane 4, approximately the same water pressure is built up on the raw water side 5 as on the pure water side 6 of the treatment apparatus 1. In order to then, at intervals of time, abruptly and briefly lower the static water pressure that exists on the raw water side 5 relative to the static water pressure that exists on the pure water side 6—as is shown in FIG. 4—the raw water discharge is released first, before any opening of the pure water discharge, so that the static pressure that exists on the pure water side 6 is facing a comparatively lower static water pressure and the correspondingly higher dynamic water pressure on the raw water side 5. In this rinsing phase, which is shown in FIG. 4, there exists a static water pressure on the raw water side 5 that is lower in comparison with the pure water side 6 of the treatment apparatus 1, for which reason pure water transfers from the pure water area 6 through the membrane 4 into the raw water side 5, and in doing so, rinses out the particles of dirt lying on the membrane 4 on the raw water side. In conjunction with this, the static pressure of the raw water flowing past the membrane 4 can be reduced even further by means of an increase in the speed of the flow, and thus the dynamic water pressure of the raw water that is being supplied to the treatment apparatus 1 in arrow direction Pf2 (cf. FIG. 4). In FIG. 4, this increase in the speed of the flow of the raw water is shown by double arrows.

To increase the cleansing effect during the rinse phase, it is also possible for raw water discharge to be alternately opened and closed repeatedly while the pure water discharge is closed. As a result of this, a repeated, pulse-like change in pressure is brought about on both sides of the membrane, along with the corresponding surge-like reverse flows of pure water through the membrane.

If, in conjunction with that, the stop valve 15, and thus the discharge of pure water, is opened again, the water pressure that exists on the raw water side 5 then exceeds the water pressure that prevails on the pure water side 6 of the treatment apparatus 1, so that the treatment apparatus 1 again makes the transition into the pure water production phase until the next reversal of flow direction. After a certain period of operation, a reversal of the flow direction of the raw water can be carried out again in accordance with FIGS. 1 through 4—but with reversed directions of flow.

It is beneficial if the intervals of time that are provided for a reversal of the direction of flow and/or for a change of the water pressure at the membrane 4, and/or the extent of the water pressure change at the membrane 4, are chosen depending on the degree of contamination of the raw, or feed water. It can also be beneficial if, especially during the rinse phase shown in FIGS. 1 through 3, pure water, or a water with a lower salt content, is temporarily fed through one of the apparatus openings 10 and 11 to the treatment apparatus 1 as the raw water, which flows past the membrane in arrow direction Pf2.

The flow direction reversal, which is shown in FIG. 1 on the one hand and in FIGS. 2 through 4 on the other, as well as the supplying of pure water into the raw water area 5 of the treatment apparatus 1 by means of the apparatus openings 10 and 11, can, for example, be carried out by means of appropriate multiple-way valves, which are part of a flow-reversal device.

In order to achieve an abrupt static pressure change on the raw water side 5 with respect to the pure water side 6 of the treatment apparatus 1, it is beneficial if the stop valves 14 and 15 that are assigned to the apparatus openings 10 and 11, as well as the pure water outlet 13, are configured as ball valves, or a similar type of quick-acting fitting.

Figure 5:
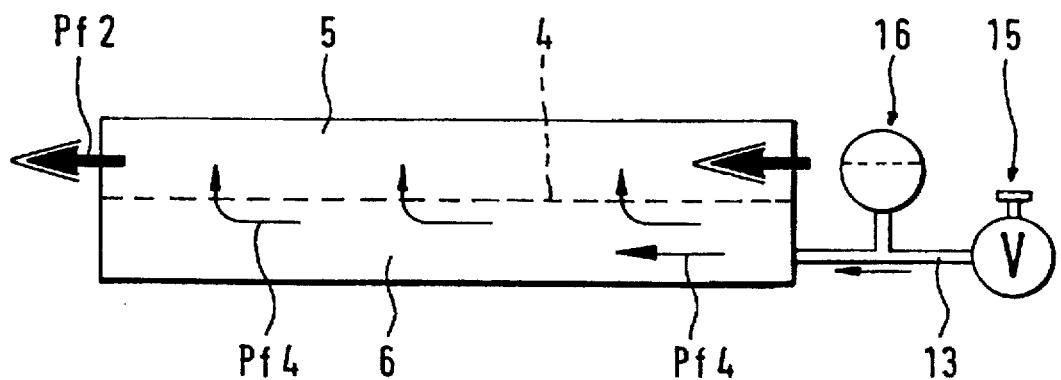

In order to be able to clean the membrane 4 as long as possible and as effectively as possible during this rinsing phase, the treatment apparatus 1 shown in FIG. 5 exhibits, between the pure water area 6 of the treatment apparatus 1 and the stop valve 15 of the pure water outlet 13, an intermediate reservoir 16 which is connected without a check valve to the treatment apparatus' pure water area and which encourages a longer cleansing back-flow of the pure water through the pores of the membrane 4 into the raw water area 5 of the treatment apparatus 1, and which forms an air-chamber-like pressure cushion for increasing the reverse-rinse intensity. In conjunction with that, the rinse phase represented in FIGS. 4 and 5 can take place before, during, or after a flow direction reversal of the raw water past the membrane 4.

While the flows of raw water in FIGS. 1 through 5 are designated by Pf1 and Pf2, the reference symbols Pf3 (pure water production phase) and Pf4 (rinsing phase) are assigned to the flows of pure water.

Since the winding module 3 of the treatment apparatus 1, in accordance with the invention, is cleaned at intervals of time by means of a reversal of the flow direction of the raw water past the membrane 4 in the raw water area 5, and by means of a brief, surge-like reverse flow of the pure water from the pure water area 6 through the membrane 4 into the raw water area 5, a sieve-like pre-filter can be dispensed with, which makes for a not-insignificant savings of space and expense. With the treatment apparatus 1, coarse particles are trapped in the region of the apparatus openings 10 and 11, in conjunction with which the two faces of the winding module are used as a deposit filter and a pre-filter. In order to increase this cleaning effect of the apparatus openings 10 and 11, it can be beneficial if chemical deposit aids, adsorption agents, and/or absorption agents are fed into the raw water ahead of the membrane 4 in the direction of flow, at least during one of the flow directions that are shown in FIG. 1 on the one hand, and in FIGS. 2 through 4 on the other. Also, an advantage of the treatment apparatus 1, in accordance with the invention, is the fact that the annular gap formed between the winding module 3 and the apparatus housing 2 is cleaned by the raw water that flows past the winding module 3 in arrow direction Pf2 (cf. FIGS. 2 through 4) and which, in this flow direction, lifts the sealing lip 9 of the ring seal 8 from the inner side of the apparatus housing 2 and can flow past the ring seal 8.

The treatment apparatus 1, which is preferably operated using the reverse osmosis technique, is distinguished by its long operational and membrane service lifetimes.

I claim:

1. Process for the production of pure water, in which raw water is fed in a first flow direction to a treatment apparatus having a raw water side and a pure water side, comprising the steps of:

passing a partial quantity of raw water through at least one semi-permeable membrane disposed within the treatment apparatus under a driving force of a pressure differential to obtain pure water;

discharging the remaining quantity of raw water flowing past the membrane in the first flow direction from the treatment apparatus as a concentrate;

reducing the discharge of pure water at timed intervals to increase static water pressure on the pure water side of the membrane;

following the increase in the static water pressure on the pure water side, reversing the direction of flow of the raw water that flows past the membrane to lower static water pressure that exists on the raw water side of the treatment apparatus relative to the static water pressure on the pure water side to reverse the flow of pure water through the membrane; and increasing pure water discharge.

2. Process in accordance with claim 1, further comprising the step of increasing the speed of the raw water flowing past the membrane in order to lower the static water pressure on the raw water side.

3. Process in accordance with claim 1 further comprising the steps of:

reducing the discharge of the raw water at the time the discharge of the pure water is reduced; and before increasing the pure water discharge, increasing the raw water discharge.

4. Process in accordance with claim 1, further comprising the step of:

choosing the extent of the water pressure change at the membrane depending on the degree of contamination of the raw water.

5. Process in accordance with claim 1, further comprising the step of:

temporarily feeding to the treatment apparatus, for intermittent flow through the raw water area in a reverse flow direction, one of pure water and water with a salt content that is lower in comparison with the raw water.

6. Process in accordance with claim 1, further comprising the step of:

feeding at least one of chemical deposit aids, adsorption agents, and absorption agents into the raw water ahead of the membrane in the direction of flow.

7. Process in accordance with claim 1, characterized by the fact that the process for pure water production is a reverse osmosis process.

8. Treatment apparatus for the production of pure water comprising at least one semi-permeable membrane which separates a raw water area of the treatment apparatus from a pure water area such that a partial quantity of the raw water that flows past the membrane passes through the membrane as pure water under the driving force of a pressure differential, at least first and second apparatus openings in fluid communication with the raw water area, a flow reversing device in fluid communication with the first and second apparatus openings via conduits, the flow reversing device being adapted to direct raw water to the first apparatus opening and to allow discharge of a concentrate from the second apparatus opening in a first configuration to feed raw water to the membrane in a first flow direction, and the flow reversing device being adapted to allow discharge of concentrate from the first apparatus opening and direct raw water to the second apparatus opening in a second configuration to feed raw water to the membrane in a second flow direction, at least one pure water outlet in fluid communication with the pure water area, and a pressure control valve being located at each of the first and second apparatus openings and the pure water outlet for regulating the flow through the apparatus openings and the pure water outlet for changing water pressure in the raw water and pure water areas.

9. Treatment apparatus in accordance with claim 8, characterized by the fact that the valves are ball valves.

10. Treatment apparatus in accordance with claim 8, characterized by the fact that between the pure water area and the valve at the pure water outlet there is provided an intermediate reservoir that is fluidly connected to the pure water area of the treatment apparatus.

11. Treatment apparatus in accordance with claim 8, further including at least one spiral wound module as the semi-permeable membrane.

12. Treatment apparatus in accordance with claim 11, further comprising a housing having an interior for holding the spiral wound module, the housing interior being connected to a raw water line, and an annular gap being located between the spiral wound module and the housing interior, a ring seal being located at an end region of the spiral wound module which is adapted to seal the annular gap in only one direction of flow, and which is permeable in the opposite direction of flow.

* * * * *